(12) United States Patent
Park

(10) Patent No.: US 6,784,963 B2
(45) Date of Patent: Aug. 31, 2004

(54) MULTI-DOMAIN LIQUID CRYSTAL DISPLAY AND METHOD OF FABRICATING THE SAME

(75) Inventor: Ku Hyun Park, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 276 days.

(21) Appl. No.: 09/782,524

(22) Filed: Feb. 14, 2001

(65) Prior Publication Data

US 2001/0033352 A1 Oct. 25, 2001

(30) Foreign Application Priority Data

Feb. 15, 2000 (KR) .......................................... P2000-7152

(51) Int. Cl.⁷ .............................................. G02F 1/1337
(52) U.S. Cl. ...................................... 349/129; 349/117
(58) Field of Search ................................ 349/117, 129, 349/123, 126, 132, 96, 118, 119, 120

(56) References Cited

U.S. PATENT DOCUMENTS 5,142,393 A * 8/1992 Okumura et al. ........... 349/121
5,850,274 A * 12/1998 Shin et al. ................... 349/129
5,909,265 A *  6/1999 Kim et al. ................... 349/129
5,982,464 A * 11/1999 Wang et al. ................. 349/108
6,175,399 B1 *  1/2001 Mitsui et al. ................ 349/113
6,204,905 B1 *  3/2001 Koma et al. ................. 349/138
6,320,629 B1 * 11/2001 Hatano et al. ................. 349/15

OTHER PUBLICATIONS

Shin–Tson Wu, "Phase–matched compensation films for liquid crystal displays", Materials Chemistry and Physics, Feb. 1995, pp. 163–168.*

* cited by examiner

Primary Examiner—Robert H. Kim
Assistant Examiner—David Y. Chung
(74) Attorney, Agent, or Firm—Morgan Lewis & Bockius LLP

(57) ABSTRACT

A multi-domain liquid crystal display and method of fabricating the same is disclosed in the present invention. More specifically, a liquid crystal display includes first and second substrates, a liquid crystal layer between the first and second substrates, wherein the liquid crystal layer has a twist angle in a range of 1 to 89 degrees, and an optical plate between the liquid crystal layer and the second substrate, wherein the optical plate has an optical axis horizontal to the first and second substrates.

16 Claims, 6 Drawing Sheets

FIG.1
CONVENTIONAL ART
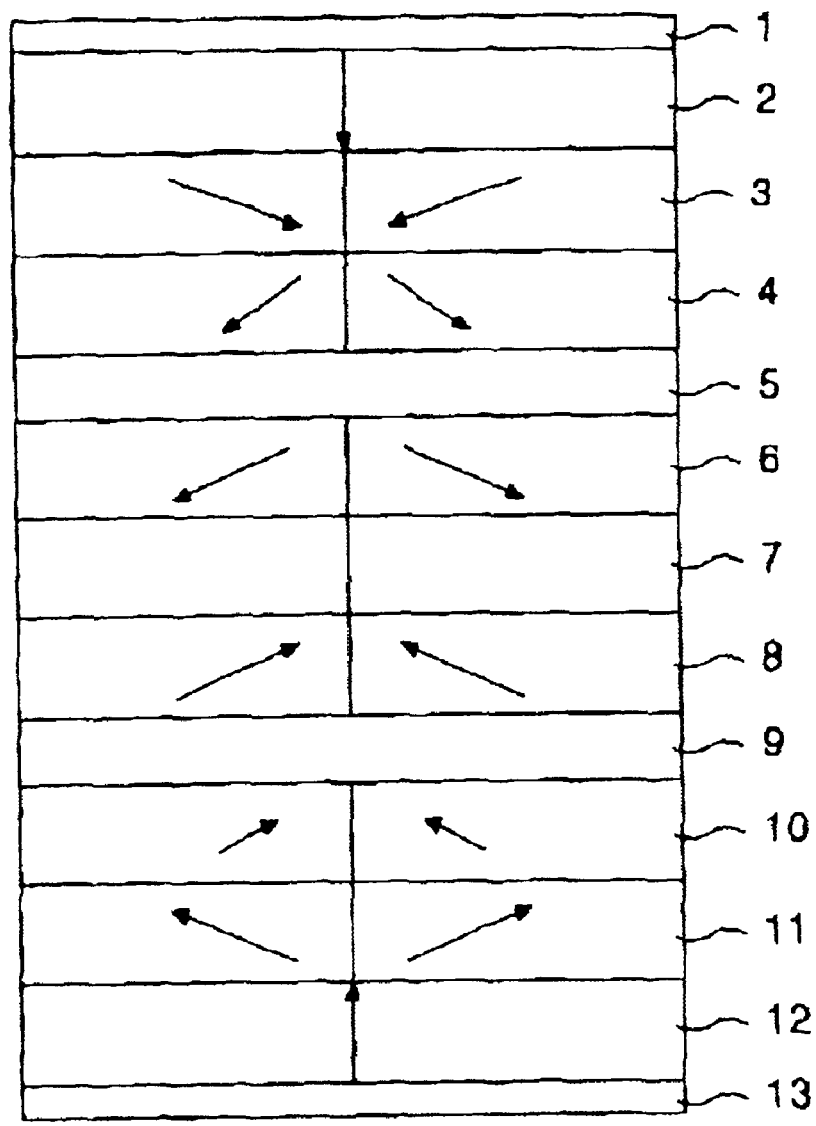
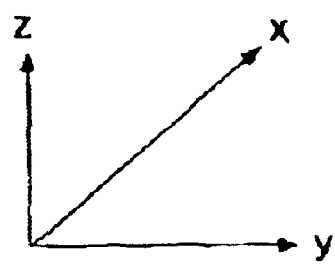

FIG.2
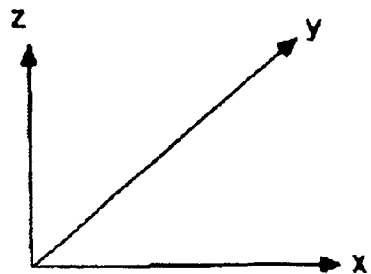
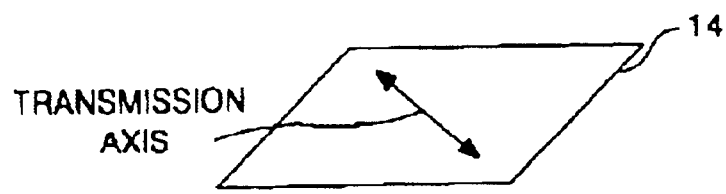
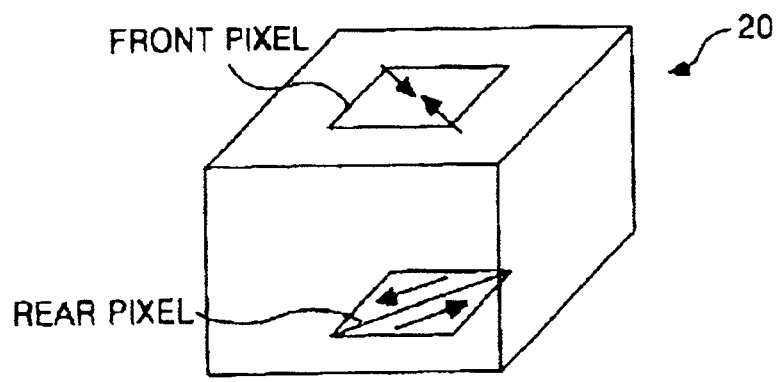
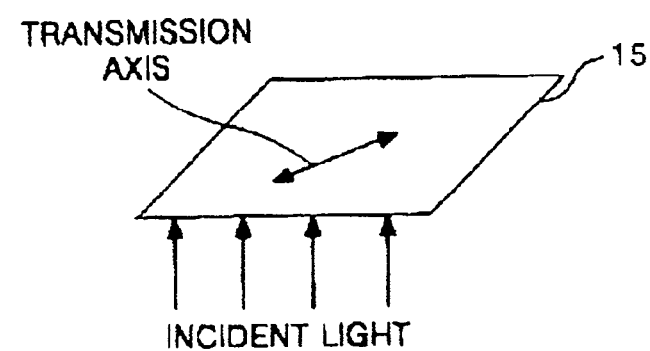

MULTI-DOMAIN LIQUID CRYSTAL DISPLAY AND METHOD OF FABRICATING THE SAME

This application claims the benefit of Korean Application No. 2000-7152 filed on Feb. 15, 2000, which is hereby incorporated by reference.

BACKGROUND OF THE INVENTION

1. Field of the Invention

This invention relates to a liquid crystal display, and more particularly to a multi-domain liquid crystal display. Although the present invention is suitable for a wide scope of applications, it is particularly suitable for a liquid crystal display that has a wide viewing angle and a simple structure.

2. Description of the Related Art

An active matrix liquid crystal display (LCD) requires a thin film transistor (TFT) as a switching device to display moving pictures. Since an LCD can be fabricated as a smaller dimension than a CRT, it has been extensively used in various applications such as a personal computer, a notebook computer, a copy machine, and a portable equipment, etc.

A twisted-nematic (TN) liquid crystal having a twist angle of 90° is mainly used as a liquid crystal for the LCD. However, the TN-LCD has a limited viewing angle. In order to improve such a deficiency, a two-domain TN-LCD has been suggested.

As shown in FIG. 1, a pixel of the two-domain TN-LCD includes two sub-domains having two different rubbing directions. A C-plate 2, a first alignment film 3, an O-plate 4, a common electrode layer 3 formed of indium tin oxide (ITO), and a second alignment film 6 are disposed between a front transparent substrate 1 and a liquid crystal 7. Similarly, a C-plate 12, a first alignment film 11, an O-plate 10, a pixel electrode 9 formed of ITO, and a second alignment film 8 are disposed between a rear transparent substrate 13 and the liquid crystal 7. The C-plates 2 and 12 have optical axes parallel to the Z-axis direction, so that they are vertical to the liquid crystal display panel. The O-plates 4 and 10 are patterned to have different tilt angles for each domain. The first alignment films 3 and 11 between the C-plates 2 and 12 and the O-plates 4 and 10 serve as an adhesive for attaching the C-plates 2 and 12 to the O-plates 4 and 10, respectively. They are then rubbed to have different alignment directions for each domain, thereby determining alignment directions of the O-plates 4 and 10. The second alignment films 6 and 8 have a liquid crystal align in different directions for each domain.

As shown in FIG. 2, polarizers 14 and 15 having polarization directions perpendicular to each other are formed on the front and rear transparent substrates 1 and 13 for a two-domain TN-LCD. Light incident and outgoing sides of the liquid crystal cell 20 are parallel to the transmission axis.

The conventional two-domain TN-LCD can improve a viewing angle by rotating a liquid crystal within a pixel to the opposite direction for each domain. The two-domain TN-LCD shown in FIG. 1 requires the C-plates 2 and 12 and the O-plates 4 and 10 on both the upper substrate and the lower substrate in order to improve a viewing angle. Thus, since the conventional two-domain TN-LCD employs a 90° TN, multi-layer optical films should be used for an optical compensation for each domain. Also, in the two-domain TN-LCD in FIG. 1, the first alignment films 3 and 11 arranged between the C-plates 2 and 12 and the O-plates 4 and 10 should be rubbed twice or have different alignment directions for each domain by a photo-alignment method. Furthermore, since a liquid crystal having a 90°-TN mode is used, the second alignment film 6 contacting the liquid crystal 7 should be aligned by twice rubbings to differentiate an alignment direction for each domain. As a result, the conventional two-domain LCD has problems in that the number of process increases and the process becomes complicated in an overall fabricating process.

SUMMARY OF THE INVENTION

Accordingly, the present invention is directed to a multi-domain liquid crystal display and method of fabricating the same that substantially obviates one or more of problems due to limitations and disadvantages of the related art.

An object of the invention is to provide a liquid crystal display that has a wide viewing angle and a simple structure.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes first and second substrates, a liquid crystal layer between the first and second substrates, wherein the liquid crystal layer a twist angle of at least 90 degrees, and an optical plate between the liquid crystal layer and the second substrate, wherein the optical plate has an optical axis horizontal to the first and second substrates.

In another aspect of the present invention, a method of fabricating a liquid crystal display having first and second substrates includes the steps of forming a liquid crystal layer between the first and second substrates, wherein the liquid crystal layer has a twist angle of at least 90 degrees, and forming an optical plate between the liquid crystal layer and the second substrate, wherein the optical plate has an optical axis horizontal to the first and second substrates.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 1 is a cross-sectional view illustrating a Z-Y plane of a liquid crystal pixel cell in a conventional liquid crystal display;

FIG. 2 is a perspective view illustrating an optical axis of the liquid crystal pixel and an optical axis of a polarizer shown in FIG. 1;

DETAILED DESCRIPTION OF THE PREFERRED EMBODIMENTS

Reference will now be made in detail to the preferred embodiments of the present invention, examples of which are illustrated in the accompanying drawings.

Figure 3:
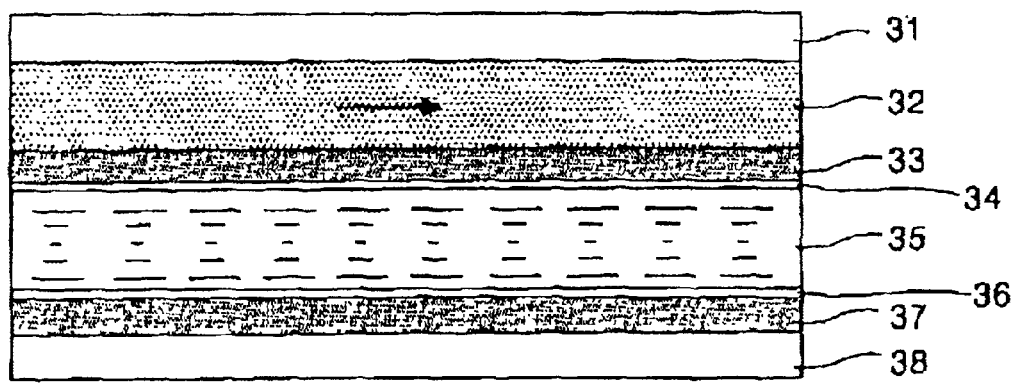
FIG. 3 is a cross-sectional view illustrating a structure of a multi-domain liquid crystal display device according to a first embodiment of the present invention.

Initially referring to FIG. 3, a multi-domain liquid crystal display is illustrated according to a first embodiment of the present invention. The multi-domain liquid crystal display device includes an A-plate 32 having an optical axis horizontal to substrates 31 and 38 and provided between a front transparent substrate 31 and a common electrode 33, and a low twisted-nematic (LTN) liquid crystal 35 injected between the common electrode 33 and a pixel electrode 37. Alignment films 34 and 36 are formed on the common electrode 33 and the pixel electrode 37, respectively. A twist angle of the LTN liquid crystal 35 is in the range of 1° to 89°. The LTN liquid crystal 35 is rotated by electric fields corresponding to a voltage difference between the voltages applied to the common electrode 33 and the pixel electrode 37, thereby controlling an intensity of the incident light. Since the multi-domain liquid crystal display has a small twist angle of the liquid crystal, it can compensate a light incident to or coming out from the TN liquid crystal only by means of a single A-plate 32 without using the C-plates and the O-plates with a hybrid structure. Thus, in compensating the light, the optical axes have different directions similar to the conventional TN liquid crystal display. The A-plate 32 is formed of a polymer such as polyimide and has an optical axis horizontal to the substrates 31 and 38, thereby compensating a phase difference of the LTN liquid crystal 35. An electric filed is applied through the common electrode 33 and the pixel electrode 37 (formed of indium tin oxide (ITO)) to the LTN liquid crystal 35. The alignment films 34 and 36 for determining an alignment direction of the liquid crystal may be rubbed in one direction. They may be however rubbed twice to differentiate an alignment direction of the liquid crystal for each domain or be subject to an alignment by a photo-alignment method, thereby generating different alignment directions to achieve a wide viewing angle.

Figure 4:
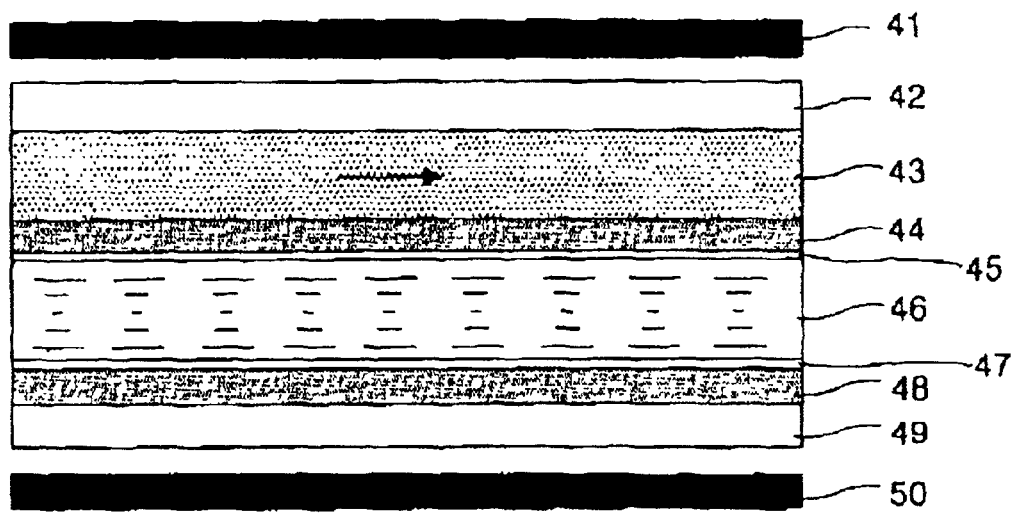
FIG. 4 is a cross-sectional view illustrating a structure of the multi-domain liquid crystal display device according to a second embodiment of the present invention.

A multi-domain liquid crystal display according to a second embodiment of the present invention is illustrated in FIG. 4. The multi-domain liquid crystal display includes an A-plate 43 having an optical axis horizontal to substrates 42 and 49 and located between a front transparent substrate 42 and a common electrode 44, a low twisted-nematic (LTN) liquid crystal 46 injected between the common electrode 44 and a pixel electrode 48, and wide viewing angle films 41 and 50 attached to the side where the light comes out from the front transparent substrate 42 and the light incident side of a rear transparent substrate 49, respectively. Alignment films 45 and 47 are formed on the common electrode 44 and the pixel electrode 48, respectively. The A-plate 43 has an optical axis horizontal to the substrates 42 and 49, thereby compensating for a phase difference of the LTN liquid crystal 46. The common electrode 44 and the pixel electrode 48, which are made of indium tin oxide (ITO), are applied by electric fields to the LTN liquid crystal 46. The alignment films 45 and 47 for determining an alignment direction of the liquid crystal may be rubbed in one direction. However, they may be rubbed twice to differentiate an alignment direction of the liquid crystal for each sub-domain or be subject to an alignment by a photo-alignment method to have different alignment directions in achieving a wide viewing-angle. The wide viewing angle films 41 and 50 have optical axes vertical to optical axes of the light incident to and coming out from the LTN liquid crystal 46, thereby improving a viewing angle.

Figure 5:
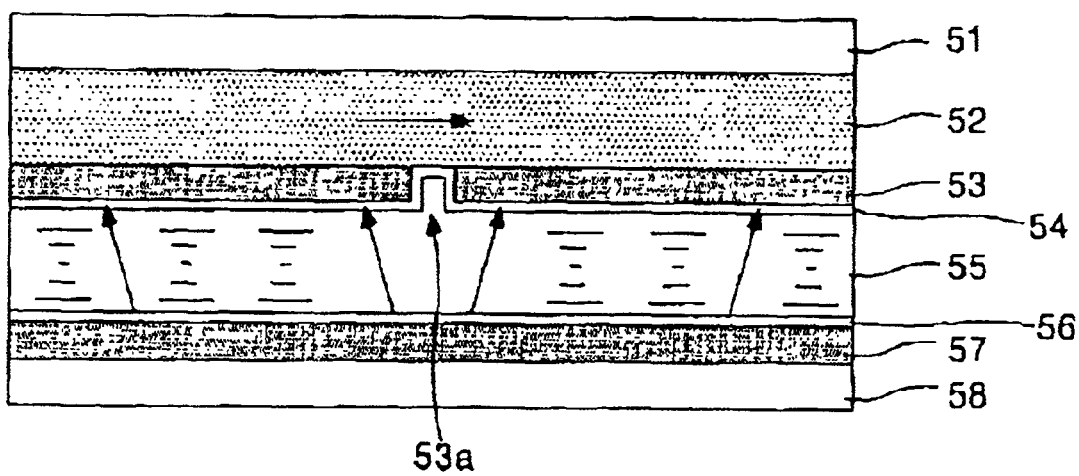
FIGS. 5 and 6 are cross-sectional views showing a structure of the multi-domain liquid crystal display device according to a third embodiment of the present invention.
Figure 6:
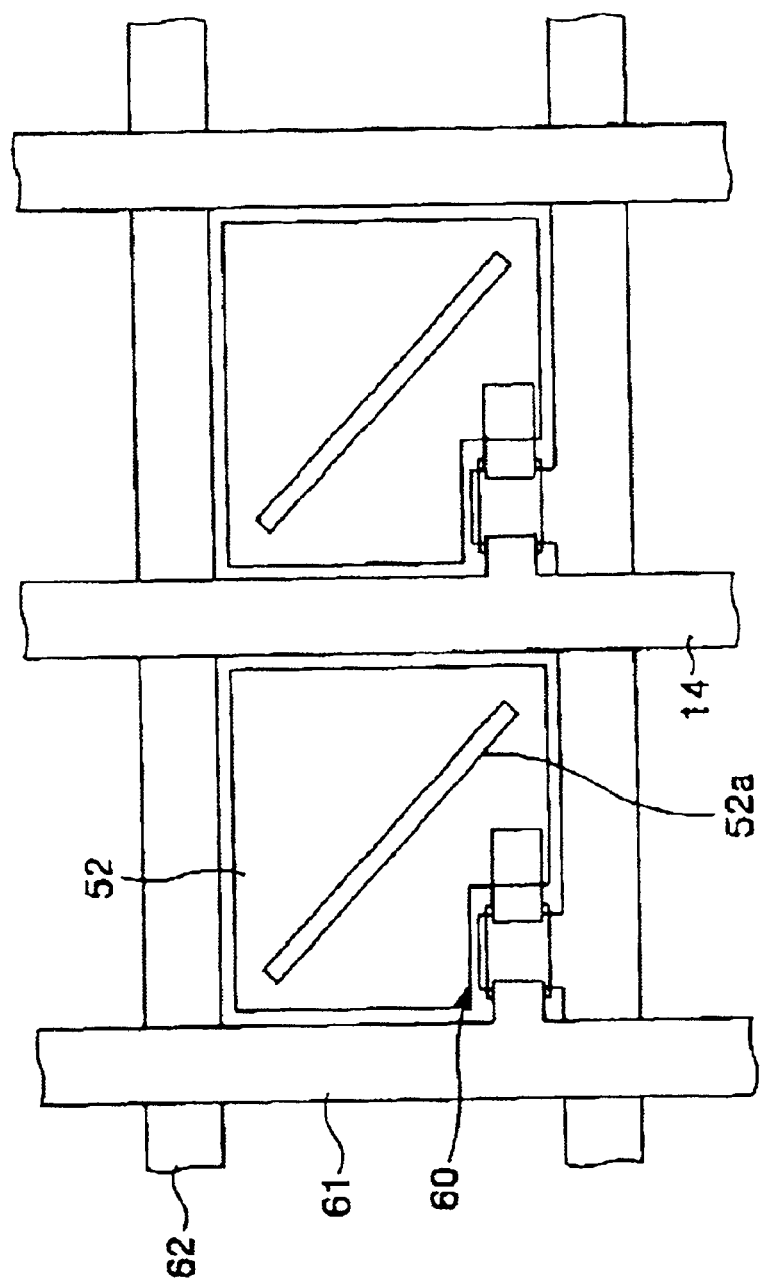

In FIGS. 5 and 6, a multi-domain liquid crystal display device according to a third embodiment is shown in the present invention. The multi-domain liquid crystal display device includes an A-plate 52 having an optical axis horizontal to front and rear transparent substrates 51 and 58 and provided between the front transparent substrate 51 and a common electrode 53, a low twisted-nematic (LTN) liquid crystal 55 injected between the common electrode 53 and a pixel electrode 57, and a slit 53a defined in the common electrode 53. When a voltage is applied to the common electrode 53 and the pixel electrode 57 through the slit 53a, the liquid crystal cells are aligned in different directions of the liquid crystal in each domain. When the slit 53a is formed in a straight-line direction or a diagonal direction, two domains are provided within one pixel.

A data signal supplied from a data line 61 is applied to the pixel electrode 57 by a switching a thin film transistor 60. In this case, the thin film transistor 60 turns on or off a channel between a source electrode and a drain electrode in accordance with a logical value of the gate pulse supplied from a gate line 62.

Meanwhile, an auxiliary electrode may be provided at the periphery of the pixel electrode 57 to differentiate an alignment direction of the liquid crystal for each domain within the liquid crystal pixel cell. The auxiliary electrode can be provided at the same layer as the gate electrode, the source/drain electrode and the pixel electrode. Alternatively, the slit 53a may be formed in a "+" shape, a "x" shape or a

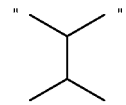

shape. The slit 53a may be provided at the pixel electrode on the lower substrate. The alignment films 54 and 56 are formed on the common electrode 53 and the pixel electrode 57, respectively. The A-plate 52 has an optical axis horizontal to the substrates 51 and 58 and compensates for a phase difference of the LTN liquid crystal 55. The A-plate 52 is provided with a slit 53a in the diagonal direction.

Figure 7:
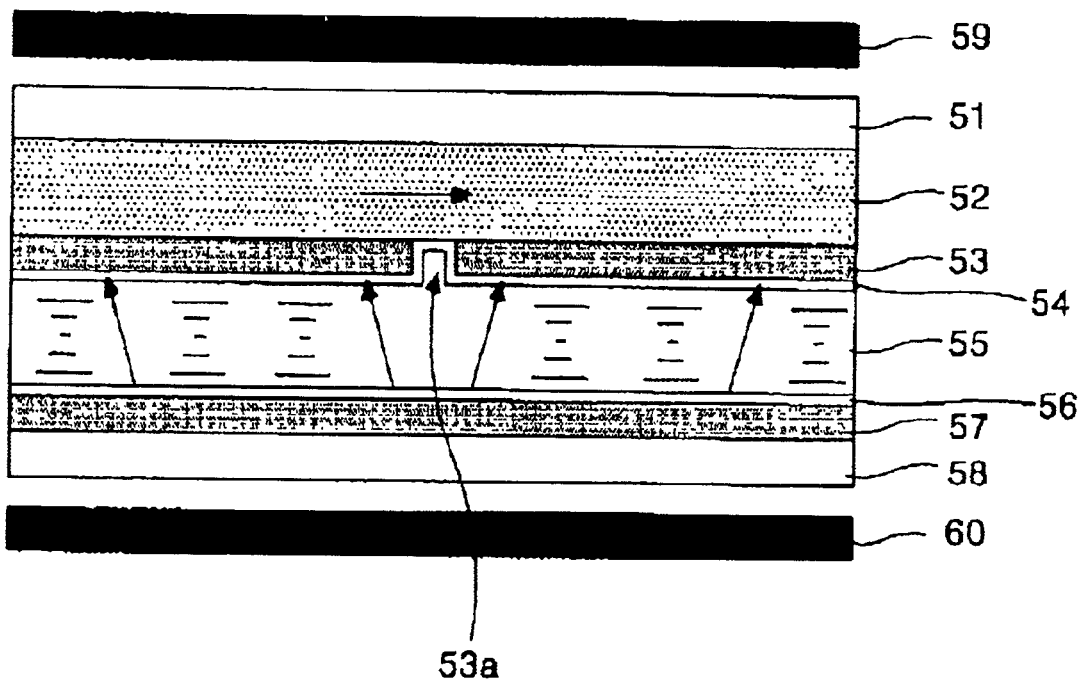
FIG. 7 is a cross-sectional view illustrating a structure of the multi-domain liquid crystal display device according to a fourth embodiment of the present invention.

Alternatively, in the liquid crystal display shown in FIG. 5, wide viewing-angle films 59 and 60 may be formed on the front transparent substrate 51 and the rear transparent substrate 58, as shown in FIG. 7.

As described above, the multi-domain liquid crystal display and method of fabricating the same according to the present invention employs a LTN liquid crystal having a small twist angle to use only an A-plate having an optical axis horizontal to the substrates rather than using optical plates having a hybrid structure formed on the common electrode within the panel. Accordingly, the present multi-domain liquid crystal display is capable of improving the viewing angle and the contrast by the A-plate as well as simplifying the panel structure and reducing the number of fabrication processes.

It will be apparent to those skilled in the art that various modifications and variations can be made in the multi-domain liquid crystal display and method of fabricating the same of the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:

first and second substrates;

a liquid crystal layer between the first and second substrates, wherein the liquid crystal layer has a twist angle in a range of 1 to 89 degrees; and an optical plate between the liquid crystal layer and the second substrate, wherein the optical plate has an optical axis horizontal to the first and second substrates;

a pixel electrode on the first substrate;

a first alignment lever on the pixel electrode;

a common electrode on the optical plate; and a second alignment layer on the common electrode.

2. The device of claim 1, further comprising a slit in the common electrode.

3. The device of claim 2, wherein the alignment layer form a at least two domains by the slit.

4. The device of claim 3, wherein each domain has different alignment directions.

5. The device of claim 1, further comprising:

a gate line and a data line on the first substrate; and a switching device at an intersection between the gate and data line.

6. The device of claim 5, wherein the switching device include, a thin film transistor.

7. The device of claim 1, further comprising a wide viewing angle film on either the first substrate or the second substrate.

8. A method of fabricating a liquid crystal display having first and second substrates, the method comprising:

forming a liquid crystal layer between the first and second substrates, wherein the liquid crystal layer has a twist angle in a range of 1 to 89 degrees;

forming an optical plate between the liquid crystal layer and the second substrate, wherein the optical plate has an optical axis horizontal to the first and second substrates;

forming a pixel electrode on the first substrate;

forming a first alignment layer on the pixel electrode;

forming a common electrode on the optical plate; and forming a second alignment layer on the common electrode.

9. The method of claim 8, further comprising the step of forming a slit in the common electrode.

10. The method of claim 9, wherein the alignment layer forms at least two domains by the slit.

11. The method of claim 10, wherein each domain has different alignment directions.

12. The method of claim 11, wherein the different alignment directions are formed by a rubbing method.

13. The method of claim 11, wherein the different alignment directions are formed by a photo-alignment method.

14. The method of claim 8, further comprising the steps of:

forming a gate line and a data line on the first substrate; and forming a switching device at an intersection between the gate and data lines.

15. The method of claim 14, wherein the switching device includes a thin film transistor.

16. The method of claim 8, further comprising the step of forming a wide viewing angle film on either the first substrate or the second substrate.

* * * * *